United States Patent [19]
Frasier et al.

[11] 3,878,095
[45] Apr. 15, 1975

[54] DIALYSIS APPARATUS

[75] Inventors: Jordan D. Frasier; Albert Stevens, both of Orange, Calif.

[73] Assignee: Advanced Medical Sciences, Inc., Lawndale, Calif.

[22] Filed: May 2, 1974

[21] Appl. No.: 466,397

[52] U.S. Cl. .................... 210/87; 210/96; 210/180; 210/321
[51] Int. Cl. ............................................. B01d 31/00
[58] Field of Search ........... 210/87, 88, 90, 96, 180, 210/321

[56] References Cited
UNITED STATES PATENTS

| | | | |
|---|---|---|---|
| 3,598,727 | 8/1971 | Wielock | 210/321 X |
| 3,814,249 | 6/1974 | Eaton | 210/86 |

*Primary Examiner*—Frank A. Spear, Jr.
*Attorney, Agent, or Firm*—Georges A. Maxwell

[57] ABSTRACT

A hemo dialysis apparatus adapted to establish a heat tempered de-aerated dialysate solution from supplies of water and dialysate concentrate and to controllably conduct the solution through a dialyzer at fixed predetermined rate, pressure, temperature and salinity, said apparatus comprising novel inter-related means to heat, de-aerate and to establish operational head pressure on a replenishing supply of tap water, wherein the water is partially heat tempered by heat exchange between inflowing tap water and used solution prior to its being discharged as waste and is further and subsequently heated by a temperature controlled resistance heater means and wherein a pump is utilized to establish air fractionating pressure on the water and delivers the air and water into a combination air-water separation and pressure accumulator tank and causes a portion of the de-aerated and heated water to be recirculated through the heating means and the pump and/or de-aerating portion of the apparatus to partially pretemper inflowing water and reduce the air content of the water acted upon by said pump.

8 Claims, 1 Drawing Figure

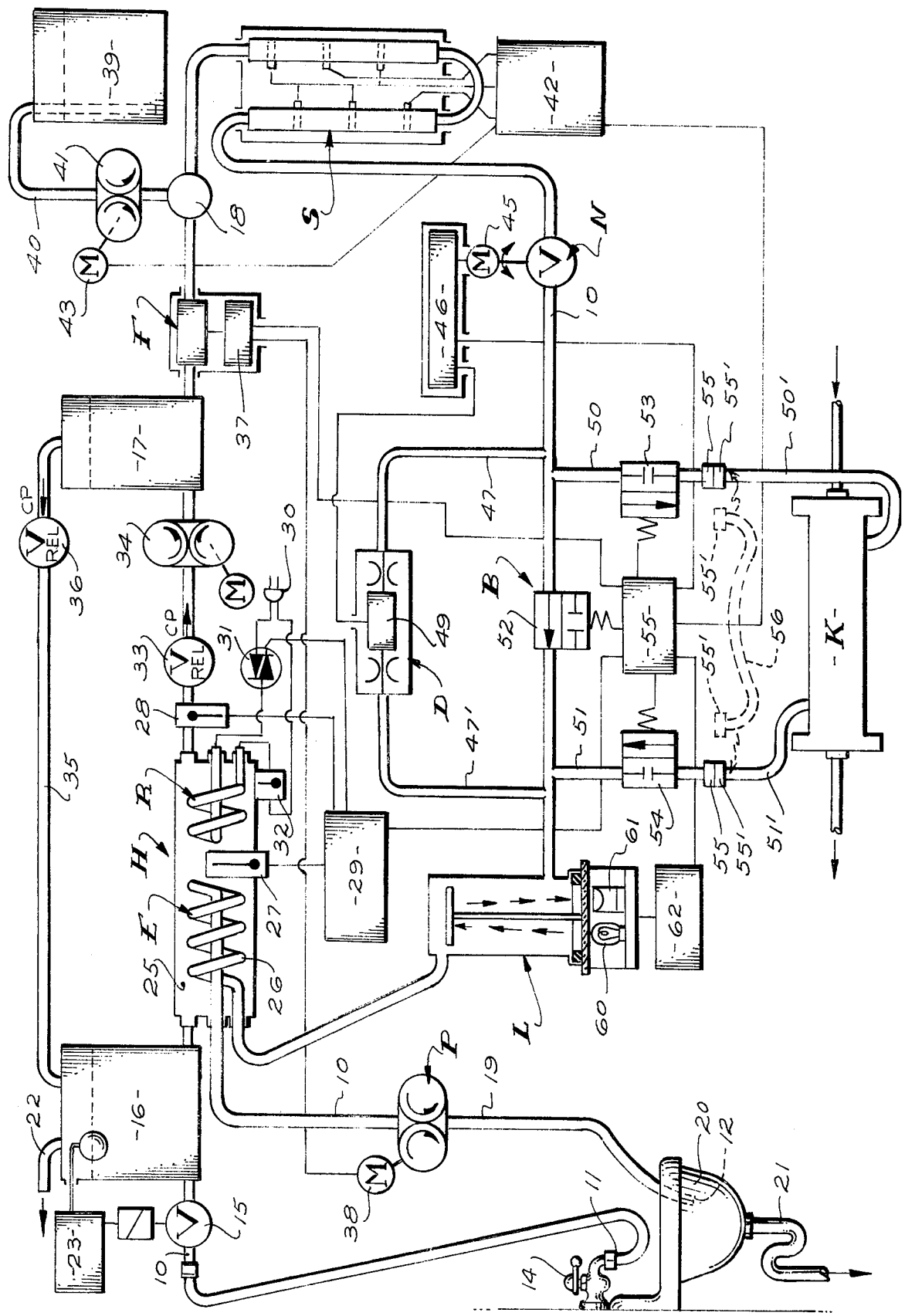

2
DIALYSIS APPARATUS

This invention has to do with an artificial kidney or dialysis apparatus and is more particularly concerned with such an apparatus having novel, improved, means for more effectively and efficiently performing the work to be effected thereby.

The ordinary artificial kidney or dialysis apparatus of the general class here concerned with utilizes a Kiil dialyzer or device, a supply of dialysate concentrate and a supply of tap water, that is, water supplied by a municipal water service or the like. The apparatus functions to mix the concentrate and water to establish a desired dialysate solution and to circulate that solution through the Kiil dialyzer or device. The solution is conducted through the Kiil device where it serves to remove waste from the blood of a patient, which blood is circulated through the device, separated from the solution by a porous membrane. Subsequently, downstream of the Kiil device, the blood is returned to the patient and the spent solution is discharged as waste.

In carrying out the above, it is very important that substantially no interchange of air take place in the device, between the solution and the blood. Accordingly, it is important that the apparatus be provided with degassing means for removing excess free and dissolved air from the inflowing water, before it is conducted into and through the device.

In practice, the dialysate concentrate is a prepared solution of water and appropriate salts, having a high concentration of salts. The concentrate solution is made a substantial period in advance of its use and a supply (in appropriate containers) is ordinarily maintained available for use. To maintain the supply of concentrate sterile, in substantially standard and uniform concentration and to assure maximum shelf-like sterilized, generally distilled and substantially air free, or degassed water is employed in its establishment.

As a result of the above, it is desirable and important that the water used in establishing the solution be degassed before the concentrate is added thereto and mixed therewith, since the substantially gas-free concentrate is subject to picking up and holding or entraining a greater amount of free air or gases than does the water alone.

In light of the above, if the concentrate is added to the water before excess and/or free gas is removed from the water, the concentrate tends to absorb and/or hold some of the air carried by the water and which would otherwise be exhausted. Accordingly, removing of air or gas from the solution is made more difficult, requires the expenditures of more work energy and eliminates any advantage that might otherwise be attained through use of the previously degassed concentrate and water.

An object and feature of the instant invention is to provide an apparatus of the character referred to above having improved degassing means to remove free and dissolved air or gases from the water, means for introducing and mixing dialysate concentrate with the water and an apparatus wherein the degassing means is upstream and separate from the concentrate and water mixing means whereby the water is degassed before the concentrate is added thereto.

In the operation and use of the ordinary dialysis apparatus, the Kiil device functions as a heat exchanger and transfers heat between the blood and the water conducted through it. It is important that the solution be at or near the body temperature of the patient so that the temperature of the patient's blood is not altered excessively as the return and introduction of blood into the patient which is too cold, or which is too warm will cause severe shock to the patient which might result in irreparable harm.

As a result of the above, it is common practice to provide dialysis apparatus of the character here concerned with with appropriately controlled heater means, which means serve to elevate and maintain the temperature of the water at a desired level. Heating of the water is ordinarily effected by means of an electric resistance heater which heater is preferably arranged upstream of the concentrate and water mixing means so that burning and/or carmelizing of the salts by the concentrated heat of the heater cannot occur.

The heaters in ordinary systems supply that heat energy required to elevate the supply of water from its normal tap temperature to a predetermined, elevated temperature which is greater than the operating temperatures and such that sufficient extra heat is present to compensate for normal heat loss in the apparatus and to heat the concentrate added thereto. As a result, a rather high output heater drawing considerably current must be used.

The heated, spent or used solution is discharged as waste and the heat-energy stored therein is wasted.

An object and feature of the present invention is to provide an improved system or apparatus having novel water heating means which includes a heat exchanger upstream of an electric heater and through which the spent solution is conducted, whereby the heat of the spent or used solution is conducted into the inflowing water prior to introduction of heat by the electric heater, whereby the chill is removed therefrom and so the heater output requirements and current consumption are materially reduced.

In the ordinary apparatus or system of the character referred to where hot waste solution is discharged into a sink or basin for disposal, the vapors of the heated salty solution escape into the area or room in which the apparatus and patient are stationed. The odor of the solution and/or vapors often become quite nauseating to the patient and others who are present.

It has been found that through use of the heat exchanger provided by the present invention, the waste solution is cooled whereby the amount of vapor which escapes therefrom, when deposited in a sink or the like, is materially reduced. This reduction of escaping vapor has proven to be such that the odor factor above referred to is reduced to a level which is such that it is seldom objectionable.

It is another object and feature of this invention to arrange the water heating means upstream of the degassing means whereby the said water is heated and the gases therein are heated and expended, making them more readily separable from the water, before the water is worked upon to remove the gas.

Yet another object and feature of the instant invention is to provide water heating and degassing means of the general character referred to which are corelated whereby the water worked upon is subject to recirculating or recycling in and through the said means whereby the effeciency of the heat exchange means and the heating means is materially increased and more uniform and stable tempering of the water is made possible with little variation in the current demands of the electric heater of the heating means. That is, by effecting recirculation of the water as noted, the temperature of the water is effectively raised at a slower rate than it would otherwise have to be raised and the demand for high heater output and surges of power therefor are minimized.

Still another object and feature of the instant invention is to provide an apparatus of the character referred to wherein recycling of the water supply results in the degassing means working upon the water more than once, with the result that degassing of the water to the extent possible by the degassing means is substantially assured and failure of the degasser from attaining the desired end, as when a surge of super aerated water is delivered to the apparatus from a related water service (as is often the case) is not likely to cause the degassing means to fail or bring about adverse results.

It is an object and feature of the instant invention to provide an apparatus of the character referred to above wherein the water heating and degassing means operates and functions to establish and maintain a constant supply of water at a fixed predetermined primary head pressure at or within the upstream end of the apparatus whereby water at the upstream end of the apparatus is urged and caused to flow downstream therein, at a predetermined pressure, independent of hydrant pressure and/or other and additional pumping means.

It is an object and feature of the invention to provide an apparatus of the character referred to wherein the degassing means comprises a vented input water tank receiving and holding a fixed volume of water at atmospheric pressure upstream of the water heating means, a constant flow rotary pump downstream of the water heating means, pressure relief valve between the heater and the rotary pump whereby a high negative pressure is established on the water upstream of the pump, a holding tank downstream of and receiving water from the pump and from which water is directed downstream through the apparatus, a return line from the top of the holding tank to the vented input tank and a pressure release valve in said return line establishing a predetermined positive back pressure and maintaining a fixed primary head pressure in the holding tank and within the upstream end of the apparatus.

It is an object and feature of the invention to provide an apparatus of the character referred to which includes a variable output effluent or discharge pump at the downstream end of the apparatus, a flow detector downstream of the holding tank and controlling the operation of the discharge pump whereby a fixed rate and volume of water and/or solution is conducted through the apparatus, dialysate concentrate supply means for introducing controlled, metered volumes of concentrate into the water downstream of the flow detector, a motor driven variable flow valve downstream of the concentrate supply means, a valve controlled solution bypass means downstream of the variable flow valve to connect with a Kiil device and to selectively direct the flow of solution therethrough, a pressure comparing transducer to compare the pressure upstream and downstream of the bypass means and related to and controlling the opening of the variable flow valve whereby a predetermined negative pressure between that valve and the discharge pump and in and through the Kiil device is maintained.

It is a particular object and feature of this invention to provide means for establishing and maintaining a predetermined rate of flow and negative pressure on the dialysate solution within and through the Kiil device in an apparatus of the general character referred to which includes means upstream of the device delivering solution downstream at a fixed positive pressure, a variable discharge pump at the discharge end of the apparatus downstream of the device, a flow detector upstream of the device and controlling the operation and output of the pump, a power operated variable valve upstream of the device and a pressure differential transducer communicating with the solution between the pump and the valve, at upstream and downstream sides of the device and related to and effecting the opening and closing of said valve whereby the negative pressure, in the device itself, established by the pump downstream of the valve, is controlled.

The foregoing and other objects and features of our invention will be fully understood from the following detailed description of the invention throughout which description reference is made to the accompanying diagrammatic drawing of the apparatus.

Referring to the drawing, the apparatus that we provide includes an elongate primary flow passage 10 with upstream and downstream or inlet and outlet ends 11 and 12.

The passage is coextensive with the apparatus and has various means and components connected therewith and/or arranged or positioned within it along its longitudinal extent. For purposes of describing the invention, in those instances where components, parts or means are related to and connected with and between spaced sections of the primary passage 10, they will be called out or defined as being in that passage.

The upstream end 11 of the passage is adapted to be connected with a suitable running supply of water. In practice, it is preferred and anticipated that it will be releasably connected with a water faucet of a conventional, pressurized, municipal or in-plant water service (not shown).

Progressing downstream from the faucet 14 and arranged in or connected with the passage 10 are the following parts, elements and means; an on and off valve 15; an input tank 16; heating means H, degassing means G; a holding tank 17; a flow rate detector F; a concentrate mixing chamber 18 with which a concentrate supply means C is connected, conductivity or salinity detecting means S, a variable, flow restricting valve N, dialyzer connected means B; a pressure detector D bridging the connecting means B; a blood leak detector L; a heat exchanger portion E of heating means H; an effluent or discharge pump P at or near the downstream end of the passage; and finally, a discharge or waste line 19. The waste line 19 extends from the pump P and establishes the discharge end of the flow passage. The line 19 is adapted to communicate with an appropriate fluid waste system, such as with a sink 20, closely related to the faucet 14 and which has a waste pipe 21 that extends to an in-plant and/or municipal sewer system or the like.

The valve 15 at the inlet end portion of the passage 10 is a simple solenoid operated on and off valve.

The input tank 16 is a simple reservoir arranged within (between sections of) the passage downstream of the valve 15 and is suitably vented to atmosphere as by a vent pipe 22.

Related to the tank 16 is a fluid level sensing means 23 which is cooperatively related to and/or connected with the valve 15 to effect opening and closing of the valve 15 so that a predetermined volume of water is maintained in the tank 16 throughout operation of the apparatus. The means 23 can, for example, be a simple float operated switching means for the valve 15.

The heating means H is a novel compound water heating means comprising the heat exchanger portion or section E, above referred to, an electric resistance heater section R and appropriate control means therefor.

Specifically, the heater means H includes elongate case defining a chamber 25 with upstream and downstream ends and portions. The upstream and downstream ends are connected with related sections of the passage 10. The heat exchanger section or means E comprises a heat exchanger member or coil 26 within the downstream portion of the chamber 25 and having ends connected with and between portions of the flow passage 10 between the blood leak detector L and the discharge pump P whereby the fluid or solution within the downstream end portion of the passage is circulated through the coil. With the above structure and relationship of parts, it will be apparent that the exchanger E effects a transfer of heat from the solution in the coil to the water flowing into the chamber 25 and about the coil 26.

The means H is shown as next including the electric resistance heater R, which heater is arranged in the downstream end of the chamber 25, downstream of the exchanger E and so that as the water in the chamber, flowing downstream therein, flows about the element or heater R it is suitably heated thereby, before flowing downstream and out of the chamber.

The control means for the heating means H serves to sense the temperature of the water and to control the supply of current to the heater R.

In the case illustrated, a first, probe-like temperature sensing control device 27 is provided in the chamber, between the coil 25 and heater R to sense the temperature of the water upstream of the heater R, a second, similar, control device 28 is provided in the passage 10 at or adjacent the downstream end of the chamber 25 to sense the temperature of the water flowing from the means H. The devices 27 and 28 are connected with a suitable temperature control unit 29, which unit is connected in and with the power supply 30 for the heater. The unit 29 transmits electric control signals in response to temperature variation senses by the devices 27 and 28, which signals are, for example, utilized to pulse a triac gate 31 in one leg of the power supply 30.

In operation, when the sensor 27 in the chamber 25 senses that the temperature of the water is below a fixed predetermined operating temperature, the heater R is energized. When the temperature of the water flowing from the heater means is above the operating temperature, the sensor 28, through means of the control unit 29 and gate 31, shuts the heater off. Accordingly, the heater is turned on in response to the temperature of the inflowing water and is turned off in response to the temperature of the outflowing water. Such a functional relationship is desirable since the heater is turned on before cold water reaches it and before such water has an opportunity to flow through the heating means and chill the supply of water tempered for use; as would be the case if only the temperature sensor 28 was provided. Further, if only the sensor 27 was provided, the heater R could readily overheat the water.

In practice, the unit 29 can vary widely in form and can employ any suitable form or switching means. Accordingly the heater control means can be defined as comprising spaced temperature sensors or temperature sensing control devices upstream and downstream of the heater R operatively related to and connected with the heater and a related switching means in the power supply therefor to energize and de-energize the heater in response to the temperature of the water upstream and downstream of the heater.

In addition to the foregoing, it is preferred that a temperature sensing device 32 with related switching means connected in the power supply 30 be related to the heater or the portion of the chamber 25 in which it is arranged, which device and switching means serves to turn the heater off in the event the heater becomes overheated. For example, the heater should not be left to become so hot as to boil the water and generate steam in the system.

The degassing means G comprises a first pressure release valve 33 in the passage 10 downstream of the heating means H, that is, downstream of the device 28, a motor driven pump 34 in the passage 10 in spaced relationship downstream of the valve 33 and upstream of the holding tank 17. The means G next includes a return line 35 extending from the top of the tank 17 to the input tank 16 and a second pressure release valve 36 in the line 35.

At this point it is important to note that the negative pressure control valve N downstream of the means G and between the salinity detecting means S and bypass means B, as it relates to and effects the degassing means G, is and serves the function of a flow-bean or flow restricting valve and in addition to effecting the line pressure at its downstream side, as will hereafter be described, creates a back pressure and effects the line pressure in the apparatus at its upstream side.

The pump 34 of the means G is preferably a constant speed, or output, positive displacement rotary pump, the flow or output rate of which is greater than the rate of flow of water into and out of the apparatus.

The valve 33 is a simple pressure release valve operable to maintain a constant negative pressure in the passage 10 at its downstream side. In practice, the valve 33 establishes and maintains a pressure of 25 inches Hg or about 13 lbs., p.s.i. in the passage 10 between that valve and the pump 34. The valve 36 is a simple pressure release valve operable to maintain a constant positive pressure of 150 MM Hg or about 3 lbs. p.s.i. in the holding tank 17 and the apparatus downstream of the means G to the negative pressure control valve N. That is, it maintains a constant positive, back pressure, of the magnitude noted, at its downstream side.

While the tanks 16 and 17 and the heater means G, as well as the heater means H and the negative pressure control valve N have been recited in a separate or disassociated manner, it is significant and important to note that they are in fact interrelated and cooperate with the valve 33, pump 34, line 35 and valve 36 to establish the whole of the degassing means.

In operation, the pump 34 of means G draws water from the constant water supply in the input tank 16. The water is caused to flow or is drawn through the heating means H and is heated whereby the free and dissolved air in the water is caused to expand and is conditioned for ready separation from the water. The first pressure release valve 33 creates a high negative pressure or partial vacuum on the heated water at its downstream side and upstream of the pump 34. This negative pressure causes fractionation or separation of the air and water and the combining of the separated air into large bubbles. As the air and water advance through the pump 34, the air is worked upon to bring the air bubbles into intimate contact and in such a manner that they are combined.

Due to the tempering of the water and the negative pressure established before and through the pump 34, the action of the pump working upon the fluid does not tend to combine the water and air as might be expected, but appears to enhance the desired fractionation of the air from the water.

The free air and the water issuing from the pump 34 is deposited in the holding tank 17 which tank is preferably an elongate vertically disposed tank with its lower end portion engaged in and communicating with the flow passage 10. The tank 17 is a water-air separator, that is, the free air moves to the top of the tank 17 and is thence conducted through the return line 35 and the valve 36 in that line to the input tank 16. Since the pump delivers a greater volume of water than flows through the apparatus, a portion of the water in the tank 17 is moved, with the air, through the line 35 and valve 36 to the tank 16 for recirculation through the heater and the degassing means.

The tank 16 is, as noted above, vented, as at 22, and the interior thereof is at atmospheric pressure. The air returned to the tank 16 from the tank 17 is therefore free to escape and is vented to atmosphere.

The heated water returned from tank 17 to tank 16 heats and partially tempers the water in the tank 16 and supplements the function of the heat exchange E of the means H whereby a minimal amount of heat is required to be added by the heater R. Further, as a result of the above, pretempering of the water, the temperature differential of the water from the upstream to the downstream end of the heater R is materially reduced and such that the load and work demand upon the heater R is more steady and uniform.

It is to be further noted that degassed water flowing from the tank 17 back into tank 16 mixes with fresh aereated water supplied through the valve 15, from the water supply or service and serves to thereby dilute the aereated water and reduce the volume of free and dissolved air in the tank 16. This reducing of the volume of air in the tank 16 reduces the amount of air which must be removed by operation of the valves and pump of the degassing means at any one time and serves to protract and even out or make the degassing operation more uniform and steady.

The above is predicated upon the pump 34 moving more water than flows through the apparatus and which results in a recirculation of a portion of the water delivered into tank 17, back to tank 16. In practice, the volume of water moved by pump 34 can be two or three times the volume of water flowing through the apparatus with the result that the water is worked upon by the degassing means 2 or 3 times.

While the above is desirable and results in more sure and uniform operation, the degassing means is such that it will, under ordinary circumstances, operate to de-aereate the water upon a single pass through the pump. Accordingly, the above noted recirculation of water is not imperative and if the pump 33 operates only to deliver water at that same rate that it flows through the apparatus, satisfactory results can usually be anticipated.

It is to be noted that the tank 17 in combination with the pump 34, valve 36 and the negative pressure valve 36 and the negative pressure valve means N downstream of the heating and degassing means is a water pressure accumulator tank and maintains its supply of water at 150 MM Hg. or about 3 lbs. p.s.i. for delivery downstream through the apparatus.

The flow detector F, in the passage 10 immediately downstream of the tank 17 can vary widely in form and can be any one of several commercially available means or devices which, when engaged in a flow stream, operate to translate the rate of flow into an appropriate electrical signal or which result in a proportional variation in voltage or current in a current conducted therethrough. Since the detector is related to the flow passage 10 which passage is of fixed diameter, detection of the rate of flow can be and is also translated into volume of flow.

The detector F is related to and serves to control the operation and resulting volume and/or rate of flow through and from the discharge pump P at the downstream end of the apparatus.

The pump P is preferably a variable capacity, positive displacement, motor driven rotary pump.

The detector F includes or is connected with a suitable, electrical, flow controller unit 37, which unit is connected with the motor 38 of the pump P, as indicated. As the volume and/or rate of flow by and/or through the detector F increases and decreases from a predetermined rate of flow, the operating speed and output of the pump P is decreased or increased accordingly and so as to maintain said predetermined rate of flow in the apparatus between the detector F and the pump P.

In the passage 10, immediately downstream of the detector F is the mixing chamber 18 which is a part of or is connected with the concentrate supply means C. The chamber 18 can be of any desired and suitable form. In its simplest form, it can be a simple T-fitting connected with and between related sections of the passage 10.

The concentrate supply means includes; a vessel 39 in which a supply of concentrate is provided or maintained; a concentrate duct 40 extending from the vessel 39 to the chamber 18 and a motor driven pump 41 in the duct and operable to draw concentrate from the vessel and deliver it into the chamber 18, to mix with the water flowing downstream therethrough.

The pump 41 is preferably a variable output, positive displacement rotary pump and is such that its delivery rate can be adjusted and varied to deliver the necessary volume of concentrate to the chamber to result in a dialysate solution of desired and proper strength or salinity.

In the passage 10, downstream of the chamber 18 is the salinity detector S which detector is in the nature and form of a conductivity detector means and such that the conductivity of the solution flowing downstream from the chamber 18 is detected. The salinity or conductivity detector includes or is connected to a salinity controller circuit unit or means 42 which unit is connected with the motor 43 of the pump 41 of the means C and serves to vary the delivery rate of the pump 41 in direct response to the salinity of the solution, as detected by the detector S. The electrical circuit of the unit or means 41 can vary considerably in practice.

In the flow passage 10, downstream of the detector S is the flow restricting variable valve N. The valve N is a variable flow or metering valve and is preferably provided with a reversible drive motor 45. The motor 45 is under control of a negative pressure control circuit unit or means 46, which unit is connected with and is responsive to the negative pressure detector D. The detector D is a pressure differential comparitor, with two pressure responsive sides connected with the passage 10, downstream of the valve N and at points upstream and downstream of the connecting bypass means B. In the case illustrated, one side of the detector D is connected with the passage 10 by an upstream line 47 and the other side is connected with the passage by a downstream line 47'.

The pressure detector D includes a signal sending unit 49 which is connected with a negative pressure controller circuit or means 46.

The controller means 46 preferably includes means for adjusting and setting the desired operating negative pressure and is such that it controls the operation of the motor 45 to effect opening and closing of the valve N to maintain the desired pressure.

It is important to note that the comparitor or detector D does not operate or function to detect the pressure in the apparatus at one single point therein, but rather detects the pressure in the system or apparatus between two space points therein. More particularly, the detector D bridges the dialyzer connecting or bypass means B and detects the pressure across, through or within the Kiil device K.

With the above relationship of parts, the pressure within the Kiil device is better determined and controlled and is not left to speculation as is the case in other apparatus of the character here concerned with where the negative pressure in the Kiil device is sought to be determined and controlled by sensing systems pressure at a single point spaced upstream or downstream of the dialyzer.

The ordinary dialyzer or Kiil device involves, basically, a structure defining a dialysate flow passage or ducting means and a blood flow passage or ducting means which passages or ducting means are separated, one from the other, by an intermediate, porous, flexible membrane. Due to the flexible nature of the membrane, the cross-sectional extent and capacity of the passages or ducts in and through the device are subject to uncontrollable variations which variations can and do effect the flow of the dialysate solution therethrough and the pressures within the device.

It will be readily seen and understood that the pressure in the Kiil device per se cannot be accurately determined by sensing or reading the pressure in the flow passage, between the valve N and pump P at one point upstream or downstream of the device K, but that the pressure in the device K can be readily accurately determined by sensing and comparing the pressure in the passage at spaced points between the valve N and pump P and at the opposite, upstream and downstream ends of the device K, as provided by the present invention.

The connecting or bypass means B that we provide is adapted to selectively bypass the solution flowing through the passage 10, between the valve N and pump P, through the related Kiil device K and is such that the apparatus can be put into a conditioning mode of operation before dialyzing is commenced and during which all desired parameters of operation can be and are established. When all desired parameters of operation are established in the apparatus, the bypass means B is operated to direct the solution into and through the Kiil device K. Further, the means B is related to other means of the apparatus and is such that should any of those means fail to properly function and/or should any of the operating parameters fail to be maintained, flow through the Kiil device is terminated or shut off and the apparatus is returned from its operating mode back to its conditioning mode of operation.

The means B includes an inlet duct 50 extending from the inlet side or end of the device K to the flow passage 10 at a point downstream of the line 47 of the detector D and the valve N; an outlet duct 51 extends from the outlet end of the device K to the passage at a point spaced downstream of the duct 50 and upstream of the line 47' of the detector D; a normally open, solenoid operated, shutoff valve 52 in the passage 10 between the ducts 50 and 51; a normally closed, solenoid operated, shutoff valve 53 in the duct 50; a normally closed, solenoid operated, shutoff valve 54 in the duct 51 and actuating means 55, in the form of a switching unit is connected with the valves 52, 53 and 54 and with the several means and devices of the apparatus to which the bypass means is responsive.

In practice, the ducts 50 and 51 have free ends provided with section 56 of quick discount fittings which fitting sections are releasably engaged with mating fitting sections 56' on the free ends of flexible hose extensions 50' and 51' at the inlet and outlet ends of the device K.

A shunt 57 with quick disconnect fitting sections 56' is provided to connect with and bridge between the free ends of the ducts 50 and 51 for the purpose of operating the apparatus to effect clearing and sterilization thereof.

The blood-leak detector L is arranged in the flow passage 10 at any desired location downstream of the duct 51 of the bypass means and involves a light emitter means 60 directing the emitted light through the solution flowing through the apparatus, a photo electric cell to receive the directed light and a blood-leak detector controller circuit unit or means 62 connected with the emitter and the cell and connected with the bypass actuating means 55. The detector L is sensitive to the light conductivity of the solution and is such that in the event the solution is rendered turbid and its light conductivity is diminished from a predetermined and acceptable level, by the presence of blood in the solution (as will result from a leak in the membrane of the Kiil device K), it operates to actuate the valves of the bypass means from their actuated position to their normal position and thereby shuts off circulation of solution through the Kiil device and terminates dialyzing.

The actuating means 55 is connected with the temperature control unit 29, flow controller unit 37, salinity controller means 42, negative pressure controller means 46 and with the blood-leak detector controller means 62 whereby the bypass means is automatically operated to switch or change the apparatus from its dialyzing mode to its conditioning mode in the event the systems operating conditions governed and controlled by any one of said controllers is not maintained or drifts from and beyond set and/or acceptable limits.

In operation, the water in the holding tank 17 and under limited constant head pressure is caused to flow downstream from the tank 17 to the valve N. The pump P draws the fluid downstream through the apparatus from the valve N, establishing the desired negative pressure thereon and discharges it, as waste through the line 19 and into the related waste system, such as the sink 20. The rate and volume of flow through the apparatus, downstream of the tank 17, is adjusted and controlled by varying the delivery rate of the pump P, which variation is effected by the flow detector F adjacent the downstream side of the tank 17 and the flow controller 37 connected with and between the detector F and the pump P.

The fluid pressure in and through the Kiil device K is controlled by opening and closing the flow restricting variable valve which is, as noted above, controlled by the negative pressure controller means 46, which means is connected with and responsive to the negative pressure comparitor or detector D.

It will be apparent that the valve N is operated toward closed so as to increase the negative pressure and thereby restricts and reduces the volume of flow below the desired volume and rate, the reduction in flow is detected by the detector F and, through means of the controller 37, the operating and output rate of the pump P is increased accordingly. The converse is true, that is, if the valve N is operated toward open, to reduce the negative pressure, a resulting increased rate of flow is detected and the operation of the pump P is altered or changed accordingly. As a result of the above, the apparatus is operational to effectively establish flow of solution through the Kiil device K at a substantially uniform, set, volume, rate and pressure.

Having described my invention, we do not wish to be limited to the specific details set forth in the preceding, but wish to reserve to ourselves any modifications and variations which may appear to those skilled in the art to which this invention pertains and which fall within the scope of the following claims:

Having described our invention, we claim:

1. An apparatus of the character referred to comprising an elongate sectional flow passage with upstream and downstream ends, an input tank at and connecting with the upstream end portion of the passage, and vented to atmosphere, water supply means communicating with the input tank to maintain a substantially uniform predetermined volume of water therein, an elongate vertical holding tank interposed in the passage downstream of the holding tank, an air and water return line between the upper portion of the holding tank and the input tank, a pump interposed in the passage between said tanks with its suction side directed upstream and operable to move a greater volume of water than flows through the apparatus, a first pressure relief valve interposed in the passage between the pump and the input tank and maintaining a predetermined air fractionating negative pressure on the water between said valve and pump, a second pressure relief valve interposed in the return line and maintaining a predetermined positive head pressure on the water in the holding tank, dialysate concentrate supply means communicating with the passage downstream of the holding tank to introduce concentrate into the water and establish a dialysate solution in the passage, a discharge pump with its suction side connected with the downstream end of the passage, a flow restricting variable valve interposed in the passage between the concentrate supply means and the discharge pump and maintaining a positive back pressure on the solution and water in the passage upstream thereof and in the holding tank and a negative pressure on the solution in the passage downstream thereof and upstream of the discharge pump, a hemo dialyzer with solution inlet and outlet ends, connecting means to connect the inlet and outlet ends of the dialyzer with upstream and downstream sections of the passage between the variable valve and the discharge pump and a waste line communicating with the discharge side of the discharge pump.

2. An apparatus as set forth in claim 1 which further includes heater means to heat the water and comprising, an elongate water conducting chamber with upstream and downstream end portions and interposed in the passage between the input tank and said first pressure relief valve, a solution conducting heat exchange member interposed in the flow passage between the discharge pump and the connecting means and extending into the downstream portion of the chamber, an electric resistance heater in the downstream portion of the chamber, a power supply for the heater, a first temperature sensing control device responsive to the temperature of the water in the chamber upstream of the heater, a second temperature sensing control device responsive to the temperature of the water downstream of the heater and switching means in the power supply connected and controlled by said control devices to energize and de-energize the heater.

3. An apparatus as set forth in claim 1 wherein said connecting means includes an inlet duct communicating with the flow passage downstream of the variable valve and with the inlet of the dialyzer, an outlet duct communicating with the passage downstream of the inlet duct and with the outlet end of the dialyzer and valving means in and related to the passage and said ducts to selectively direct the flow of solution through the passage between the ducts or through the ducts and said dialyzer.

4. An apparatus as set forth in claim 3 wherein said valving means comprises a normally open shutoff valve in the passage between the ducts, a normally closed shutoff valve in the inlet duct, a normally closed shutoff valve in the outlet duct and actuating means to simultaneously actuate the said shutoff valves from and to their normal positions.

5. An apparatus as set forth in claim 1 wherein said concentrate supply means comprises a vessel with a supply of dialysate concentrate, a mixing chamber interposed in the passage between the holding tank and the variable valve, a concentrate delivery duct between the mixing chamber and the vessel and a concentrate pump in the delivery duct and operable to draw concentrate from the vessel and deliver it into the mixing chamber.

6. An apparatus as set forth in claim 1 wherein said concentrate supply comprises a vessel with a supply of dialysate concentrate, a mixing chamber interposed in the passage between the holding tank and the variable valve, a concentrate delivery duct between the mixing chamber and the vessel and a variable delivery concentrate pump in the delivery duct and operable to draw concentrate from the vessel and deliver it into the mixing chamber, a fluid conducting conductivity detector interposed in the passage between the mixing chamber and the variable valve, operable to detect the conductivity and related salinity of the solution flowing therethrough and a salinity controller means interconnected with and between the conductivity detector and the concentrate pump to vary the delivery rate of that pump and to maintain the salinity of the solution substantially constant.

7. An apparatus as set forth in claim 1 which further includes negative pressure sensing means to detect and control the pressure in and through the dialyzer and comprising power drive means to open and close the variable valve, a pressure differential comparitor communicating with the passage at two spaced points between the discharge pump and the variable valve and upstream and downstream of the connecting means and a pressure controller means interconnected with and between the comparitor and the said drive means whereby the variable valve is opened and closed to maintain the negative pressure in and through the dialyzer substantially constant.

8. An apparatus as set forth in claim 1 wherein the discharge pump is a variable delivery pump and said apparatus further includes a flow detector interposed in the passage between the holding tank and the concentrate supply means and a flow controller means interconnected with and between the flow detector and the discharge pump to maintain the flow of water and solution through the apparatus substantially constant.

* * * * *